(12) United States Patent
Zakrewski

(10) Patent No.: US 7,522,685 B2
(45) Date of Patent: Apr. 21, 2009

(54) RESYNCHRONIZING TIMING SYNC PULSES IN A SYNCHRONIZING RF SYSTEM

(75) Inventor: David S. Zakrewski, Babylon, NY (US)

(73) Assignee: Honeywell International Inc., Morristown, NJ (US)

( * ) Notice: Subject to any disclaimer, the term of this patent is extended or adjusted under 35 U.S.C. 154(b) by 690 days.

(21) Appl. No.: 10/858,452

(22) Filed: Jun. 1, 2004

(65) Prior Publication Data

US 2005/0265501 A1    Dec. 1, 2005

(51) Int. Cl.
    *H04L 1/02*    (2006.01)
(52) U.S. Cl. .................. 375/354; 455/574; 455/502; 455/572; 370/55; 370/311; 370/95.1; 340/870.02
(58) Field of Classification Search .......... 375/354; 455/574, 502, 572; 370/55, 311, 95.1; 340/870.02; 379/60, 63, 59
    See application file for complete search history.

(56) References Cited

U.S. PATENT DOCUMENTS

| | | | | |
|---|---|---|---|---|
| 5,107,488 A | * | 4/1992 | Schreder et al. | ............. 370/315 |
| 5,392,287 A | * | 2/1995 | Tiedemann et al. | ......... 370/311 |
| 5,991,279 A | * | 11/1999 | Haugli et al. | ................ 370/311 |
| 6,799,031 B1 | * | 9/2004 | Lewiner et al. | .......... 455/404.1 |
| 7,277,457 B2 | * | 10/2007 | Gorday et al. | ............... 370/509 |
| 2001/0053710 A1 | * | 12/2001 | Gibbons et al. | ............. 455/574 |
| 2005/0059436 A1 | * | 3/2005 | Addy et al. | ................. 455/574 |

* cited by examiner

*Primary Examiner*—Shuwang Liu
*Assistant Examiner*—Helene Tayong
(74) *Attorney, Agent, or Firm*—Husch Blackwell Sanders Welsh & Katz

(57) ABSTRACT

A synchronizing method and system between a Radio Frequency (RF) transmitter and a battery powered receiver wherein the transmitter transmits short duration first periodic sync signals which are used by the receiver to maintain proper synchronization of the receiver with the transmitter during second periodic wake-up windows for transmission of data. The receiver wakes for a short duration at the start of each periodic wake up window to receive a possible transmission of data, and if no transmission is received goes back to sleep, and if a transmission is received stays awake to receive the full transmission of data. The receiver accurately times a number of consecutive first periodic sync signals received from the transmitter in order to more accurately determine when the receiving device should come out of a sleep mode.

20 Claims, 2 Drawing Sheets

RESYNCHRONIZING TIMING SYNC PULSES IN A SYNCHRONIZING RF SYSTEM

BACKGROUND OF THE INVENTION

1. Field of Invention

The present invention relates generally to resynchronizing timing sync pulses in a synchronizing RF system, and more particularly pertains to resynchronizing timing sync pulses in synchronizing battery powered RF receivers that are operated in synchronized periods to extend the battery lifetime, particularly those operating in bands wherein the transmitter duty cycle is restricted.

The present invention preferably provides a firmware solution to resynchronizing timing sync pulses in a synchronizing RF system that simply requires the receiving device to accurately time a number of consecutive synchronization pulses in order to more accurately determine when the receiving device should come out of a sleep mode.

2. Discussion of the Prior Art

The technique of transmitting periodic data messages and periodically waking a battery powered receiver to receive the periodic data messages is generally known in the art, and is used in RF communication systems, wherein a battery or line powered transmitter transmits periodic messages to a battery powered receiver to extend the battery life in the receiver.

SUMMARY OF INVENTION

The present invention provides a synchronizing method and system for resynchronizing time sync pulses in a synchronizing RF system between a Radio Frequency (RF) transmitter and receiver wherein the transmitter transmits short duration first periodic sync signals which are received and used by the receiver to maintain proper synchronization of the receiver with the transmitter during second periodic wake-up windows that are used for the transmission of data, such that the receiver will wake and be properly synchronized for possible wake up window data transmissions from the transmitter. The receiver wakes for a short duration at the start of each periodic wake up window to receive a possible transmission of data, and if no transmission is received goes back to sleep, and if a transmission is received stays awake to receive the full transmission of data.

The basic principle is that the average current consumed by the battery powered receiver in order to wake periodically to receive the first periodic sync signals to maintain synchronization to wake periodically to listen for the second periodic data transmissions is less than the average current required to maintain the receiver awake continuously.

The present invention preferably provides a firmware solution to maintaining synchronization between a transmitter and a receiver in a synchronizing RF system that simply requires the receiving device to accurately time a number of consecutive synchronization pulses received from the transmitter in order to more accurately determine when the receiving device should come out of a sleep mode.

BRIEF DESCRIPTION OF THE DRAWINGS

The foregoing objects and advantages of the present invention for resynchronizing time sync pulses in a synchronizing RF system may be more readily understood by one skilled in the art with reference to the following drawings wherein.

DETAILED DESCRIPTION OF THE INVENTION

U.S. patent application Ser. No. 10/659,952, filed Sep. 11, 2003 and commonly assigned herewith, discloses a synchronizing RF system between a Radio Frequency (RF) transmitter and receiver, particularly for use in a security alarm system. In the synchronizing RF system, the transmitter transmits short duration first periodic sync signals which are received and used by the receiver to maintain proper synchronization of the receiver with the transmitter during second periodic wake-up windows that are used for the transmission of data, such that the receiver will wake and be properly synchronized for possible wake up window data transmissions from the transmitter. The receiver wakes for a short duration at the start of each periodic wake up window to receive a possible transmission of data, and if no transmission is received goes back to sleep, and if a transmission is received stays awake to receive the full transmission of data.

Figure 1:
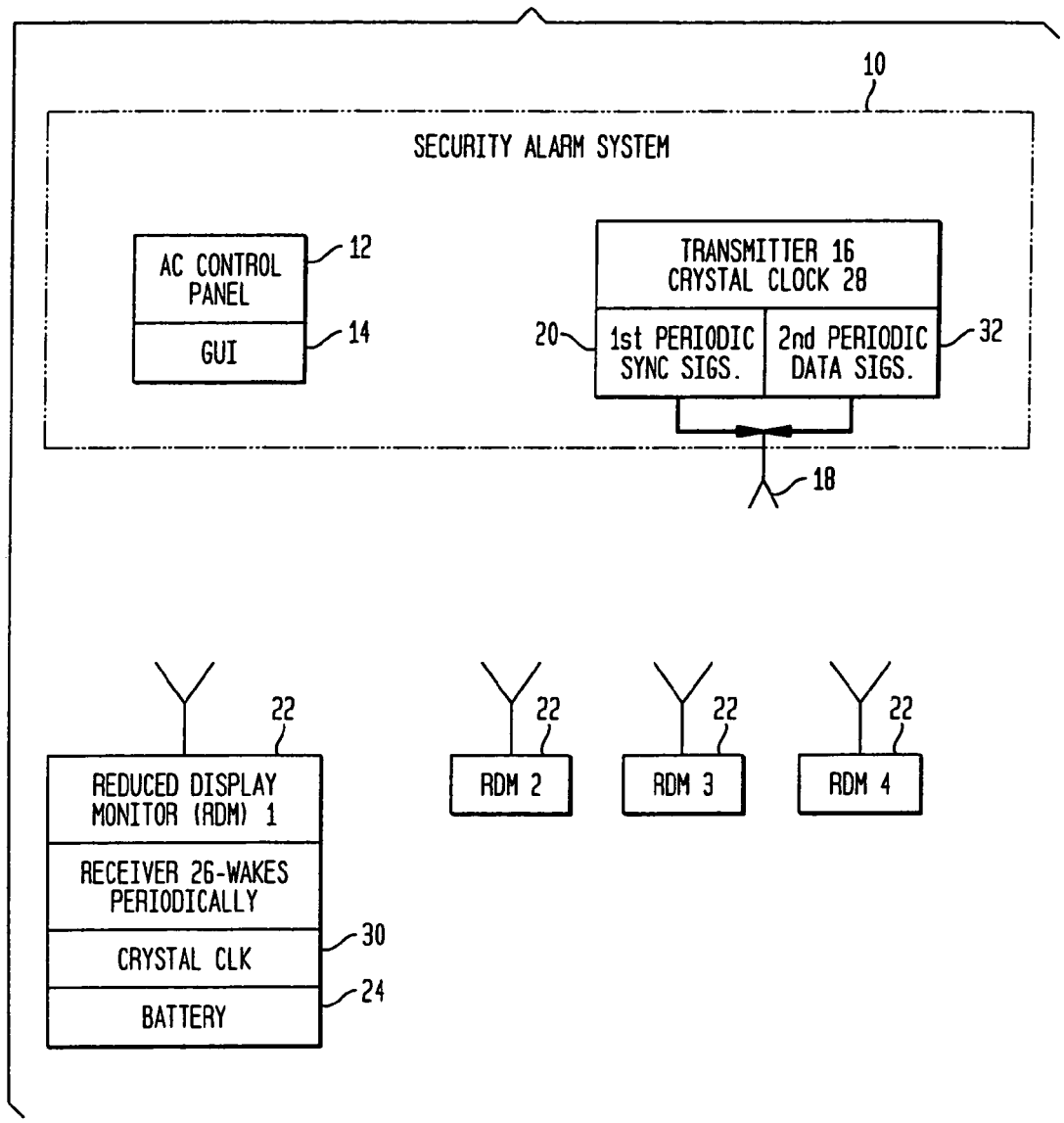
FIG. 1 illustrates one application of the present invention to a security alarm system wherein an AC powered control panel may provide a display of all pertinent parameters and conditions of the security alarm system, and also includes a local RF transmitter which transmits periodic RF messages on the present status of the security alarm system to a plurality of battery powered wireless keypads or Reduced Display Modules (RDMs).

FIG. 1 illustrates one application of the present invention in a security alarm system 10, such as an Ademco security alarm system, wherein an AC powered control panel 12, such as an Ademco wireless control panel, is located within a building protected by the security alarm system. The control panel may provide a local display of all pertinent parameters and conditions of the security alarm system, and may also provide inputs, such as a Graphical User Interface (GUI) 12, to allow a user to enter data into and access and control the security alarm system.

The control panel can also include a local RF transmitter 16 which transmits over an antenna 18 first periodic RF messages on the present status of the security alarm system to a plurality of battery powered wireless keypads or Reduced Display Modules (RDMs) 22, only one of which RDM1 is illustrated in detail, provided at a plurality of locations throughout the building. Each battery 24 powered RDM receives the local RF transmissions from the transmitter at the control panel, such that each wireless keypad RDM can also provide an accurate display of the present status of the security alarm system.

The following represents one designed embodiment of a wireless keypad RDM for use with a system control panel RF transmitter, with a reasonable response time being provided for reporting chime/entry beeps etc.

The Federal Communications Commission (FCC) in the USA in FCC Rule 15 allows up to 2 seconds of air-time to be transmitted per hour which can be used for the purposes of providing synchronization, polling, supervision etc. This additional 2 seconds does not significantly increase the system clash rate.

Pursuant to the present invention, these 2 seconds are used by the system control panel RF transmitter to send periodic sync (synchronization) messages from 20 to each battery 24 powered receiver 26 in each RDM 22. The periodicity of the sync messages is determined by the stability of the oscillator crystals in the clocks 28, 30 of the transmitter and receiver. In between the periodic sync messages, the transmitter and receiver are maintained synchronized to transmit/receive second periodic system messages and data from 32 during the same predetermined wake-up data transmission windows.

The transmitter 16 sends alarm or status messages only at the particular synchronized data transmission wake up windows or ticks. The periodicity of the synchronized data transmission wake up windows or ticks is 3 seconds, assuming that a 3 second response time period is acceptable. Each receiver 26 in each RDM 22 wakes every three seconds for a very short period of time to listen for any possible transmitter data message The present invention provides a resynchronization of the periodic 3 second time sync pulses that are currently sent by the transmitting device to each receiving device. The receiving device goes to sleep to conserve battery life, and wakes up every three seconds to remain in sync with the transmitting device. The 3 second clock must be extremely accurate, within 3 milliseconds. Moreover, this accuracy might be hard to hold over a large temperature range, and over the life of the crystals involved in each of the transmitting device and the receiving device.

Figure 2:
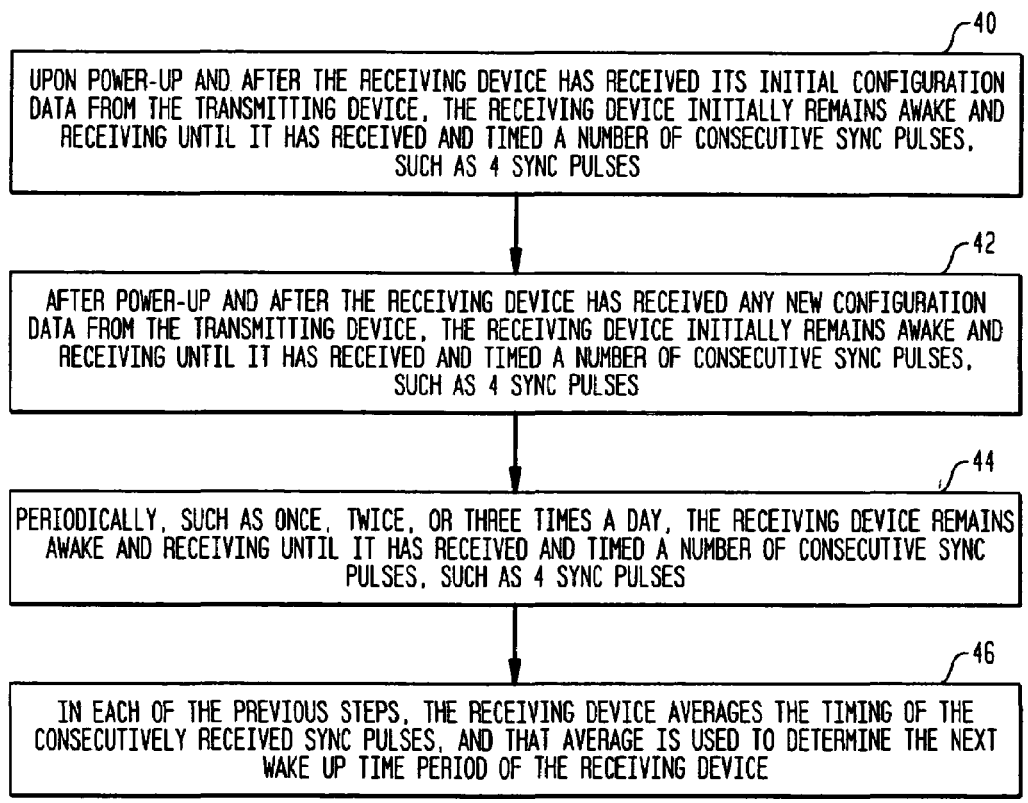
FIG. 2 is a process flow diagram of the method steps for resynchronizing time sync pulses in a synchronizing RF system pursuant to the present invention.

The receiving device, such as a wireless dialer in a security system, performs the following functions illustrated in FIG. 2, which is a process flow diagram of the method steps for resynchronizing time sync pulses in a synchronizing RF system pursuant to the present invention. At step 40, upon power-up and after the receiving device has received its initial configuration data from the transmitting device, the receiving device initially remains awake and receiving until it has received and timed a number of consecutive sync pulses, such as 4 sync pulses. At step 42, after power-up and after the receiving device has received any new configuration data from the transmitting device, the receiving device initially remains awake and receiving until it has received and timed a number of consecutive sync pulses, such as 4 sync pulses. At step 44, periodically, such as once, twice, or three times a day, the receiving device remains awake and receiving until it has received and timed a number of consecutive sync pulses, such as 4 sync pulses. Step 46 indicates that in each of the previous steps 40, 42 and 44, the receiving device averages the timing of the consecutively received sync pulses, and that average is used to determine the next wake up time period for the receiving device.

This technical approach makes the timing of the three-second-time sync pulse much less critical. For example, if the three second sync pulse actually times out at 3.005 seconds, then the receiving device wakes up once every 3.005 seconds instead of once every 3.000 seconds. This provides a much more robust system design, and alleviates many of the re-synchronizations that might otherwise be required without the technical approach of the present invention.

Each receiver 26 current is 7 mA (5 mA Rx, +0.5 mA uP, +1 mA analog+0.5 mA miscellaneous).

Each receiver needs approximately 8 ms to wake up and stabilize and needs approximately 4 ms to antenna-switch between diverse antennae and make a stay-awake or return-to-sleep decision. Assuming that a worst case allowable relative time shift between the transmitter and receiver ticks is 2 ms, therefore the stability of the oscillator crystals of the clocks in the transmitter and receiver must be such as to ensure 2 ms accuracy over the period between sync messages.

Assuming that the sync message is approximately 88 bits (5 byte preamble, 3 byte site ID, 1 byte message type, 2 byte CRC), i.e. "on" time is 8.8 ms at the preferred data rate. So, to comply with a preferred 2 second per hour target, there can be a maximum of 227 sync messages per hour, i.e. the periodicity is 16 seconds.

An accuracy of 2 ms over 16 seconds is 126 ppm maximum, say 60 ppm at the transmitter and 60 ppm at the receiver.

Each receiver 26 average current is 14 ms/3 s×7 mA=33 uA.

Assume false starts occur 1 per minute, a false start consumes 20 ms, i.e. average 20 ms/60 s×7 mA=2.3 uA.

The sync message average current is 20 ms/32 s×7 mA=3.5 uA.

Assume a loss of synchronization once per hour, which requires opening the receiver window to four times its normal width to resynchronize, or to transmit a resynchronize request, i.e. average current 80 ms/3600×7 mA=0.2 uA.

Therefore the total average current is 40 uA, i.e. 350 mAhr/year.

Note that in many instances, it may be preferred to transmit more than one sync message contiguously to ensure redundancy against interference or noise, so for example if the message was sent twice, the sync message length would increase to 17.6 mSec, and the resultant number of sync transmissions per hour would be 114, with a period of 32 seconds, and a total crystal tolerance of 63 ppm, (30 ppm in the transmitter and 30 ppm in the receiver).

AAA battery 24 cell capacity is approximately 1.8 Ahr, suggesting a possible life for a wireless keypad RDM of approximately 5 years.

While several embodiments and variations of the present invention for resynchronizing timing sync pulses in a synchronizing RF system are described in detail herein, it should be apparent that the disclosure and teachings of the present invention will suggest many alternative designs to those skilled in the art.

Having thus described our invention, what we claim as new and desire to secure by Letters Patent is:

1. A synchronizing method between a Radio Frequency (RF) transmitter and a battery powered RF receiver wherein:
    the transmitter transmits first periodic sync signals which are received and used by the receiver to maintain proper synchronization of the receiver with the transmitter during second periodic wake up windows for possible transmissions of data;
    the transmitter transmits data during at least some of the second periodic wake up windows for the transmission of data;
    the receiver wakes periodically from a sleep mode to receive the first periodic sync signals which are used by the receiver to maintain the receiver properly synchronized with the transmitter during the second periodic wake up windows for possible transmissions of data from the transmitter;
    the receiver accurately times a number of consecutive first periodic sync signals received from the transmitter in order to accurately determine the second periodic wake up windows when the receiver comes out of the sleep mode;
    the receiver wakes periodically for a short duration at the start of each second periodic wake up window to receive a possible transmission of data, and if no transmission is received goes back to the sleep mode, and if a transmission is received stays awake to receive the transmission of data, such that an average current consumed by the battery powered receiver to wake periodically to receive the first periodic sync signals to maintain synchronization and to wake periodically to listen for the possible second periodic transmissions of data is less than the average current required to maintain the receiver awake continuously.

2. The method of claim 1, wherein the receiver, upon power-up and after the receiver has received initial configuration data from the transmitter, remains awake and receiving until the receiver has received and timed a number of consecutive sync pulses.

3. The method of claim 2, wherein the receiver averages the timing of the consecutive sync pulses, and an average timing is used to determine the next wake up time period for the receiver.

4. The method of claim 1, wherein the receiver, upon power-up and after the receiver has received any new configuration data from the transmitter, remains awake and receiving until the receiver has received and timed a number of consecutive sync pulses.

5. The method of claim 4, wherein the receiver averages the timing of the consecutive sync pulses, and an average timing is used to determine the next wake up time period for the receiver.

6. The method of claim 1, wherein the receiver periodically several times a day awakes and remains awake and receiving until the receiver has received and timed a number of consecutive sync pulses 7. The method of claim 6, wherein the receiver averages the timing of the consecutive sync pulses, and an average timing is used to determine the next wake up time period for the receiver.

8. The method of claim 1, wherein the transmitter transmits the first periodic sync signals over short durations and with a periodicity such that a total of all of the first periodic sync signals over a period of one hour is equal to or less than a total of 2seconds on-air time per hour.

9. The method of claim 1, wherein the periodicity of the second periodic wake up windows is substantially 3 seconds, such that the average response time of the battery powered receiver to changes reflected by the transmissions of data is less than 1.5seconds on average and no greater than 3 seconds in a worst case.

10. The method of claim 1, operated in a security alarm system having an AC powered control panel with the transmitter which transmits periodic RF messages on the present status of the security alarm system to a plurality of battery powered reduced display monitors, each having a said battery powered receiver, to provide a display of the current status of the security alarm system.

11. A synchronizing system between a Radio Frequency (RF) transmitter and a battery powered RF receiver wherein:
the transmitter includes means for transmitting first periodic sync signals which are received and used by the receiver to maintain proper synchronization of the receiver with the transmitter during second periodic wake up windows for possible transmissions of data;
the transmitter includes means for transmitting data during at least some of the second periodic wake up windows for the transmission of data;
the receiver includes means for waking periodically to receive the first periodic sync signals which are used by the receiver to maintain the receiver properly synchronized with the transmitter during the second periodic wake up windows for possible transmissions of data from the transmitter;
the receiver includes means for accurately timing a number of consecutive first periodic sync signals from the transmitter in order to accurately determine the second periodic wake up windows when the receiver comes out of a sleep mode;
the receiver includes means for waking periodically for a short duration at the start of each second periodic wake up window to receive a possible transmission of data, and if no transmission is received goes back to sleep, and if a transmission is received stays awake to receive the transmission of data, such that an average current consumed by the battery powered receiver to wake periodically to receive the first periodic sync signals to maintain synchronization and to wake periodically to listen for the possible second periodic transmissions of data is less than the average current required to maintain the receiver awake continuously.

12. The system of claim 11, wherein the receiver, upon power-up and after the receiver has received initial configuration data from the transmitter, remains awake and receiving until the receiver has received and timed a number of consecutive sync pulses.

13. The system of claim 12, wherein the receiver averages the timing of the consecutive sync pulses, and an average timing is used to determine the next wake up time period for the receiver.

14. The system of claim 11, wherein the receiver, upon power-up and after the receiver has received any new configuration data from the transmitter, remains awake and receiving until the receiver has received and timed a number of consecutive sync pulses.

15. The system of claim 14, wherein the receiver averages the timing of the consecutive sync pulses, and an average timing is used to determine the next wake up time period for the receiver.

16. The system of claim 11, wherein the receiver periodically several times a day awakes and remains awake and receiving until the receiver has received and timed a number of consecutive sync pulses.

17. The system of claim 16, wherein the receiver averages the timing of the consecutive sync pulses, and an average timing is used to determine the next wake up time period for the receiver.

18. The system of claim 11, wherein the transmitter transmits the first periodic sync signals over short durations and with a periodicity such that a total of all of the first periodic sync signals over a period of one hour is equal to or less than a total of 2 seconds on-air time per hour.

19. The system of claim 11, wherein the periodicity of the second periodic wake up windows is substantially 3 seconds, such that the average response time of the battery powered receiver to changes reflected by the transmissions of data is less than 1.5 seconds on average and no greater than 3 seconds in a worst case.

20. The system of claim 11, operated in a security alarm system having an AC powered control panel with the transmitter which transmits periodic RF messages on the present status of the security alarm system to a plurality of battery powered reduced display monitors, each having a said battery powered receiver, to provide a display of the current status of the security alarm system.

* * * * *